H. S. CHRISTOPHERSEN.
TIRE ALARM.
APPLICATION FILED APR. 30, 1914.

1,148,357.

Patented July 27, 1915.

Witnesses
J. M. Wynkoop,
D. H. Thornett

Inventor
Hagbart Sylvester Christophersen
By Knight Bros.
Attorneys

UNITED STATES PATENT OFFICE.

HAGBART SYLVESTER CHRISTOPHERSEN, OF ODENSE, DENMARK.

TIRE-ALARM.

1,148,357.  Specification of Letters Patent.  Patented July 27, 1915.

Application filed April 30, 1914. Serial No. 835,494.

*To all whom it may concern:*

Be it known that I, HAGBART SYLVESTER CHRISTOPHERSEN, goldsmith, subject of the King of Denmark, residing at Odense 28, Vestergade, Denmark, have invented certain new and useful Improvements in Tire-Alarms, of which the following is a specification.

The invention relates to devices rendering it possible, when riding in an automobile, to discover, in ample time, any injury to the pneumatic tires, causing the air to escape slowly, so that the carriage may be stopped and the defect remedied, before the pneumatic tire has been damaged by running without inflation.

The present invention consists in a special arrangement for fastening an alarm producing resilient member to the felly of the wheel.

According to the invention, the fastening is effected by the holder for the resilient member being shaped in such a manner that it may be inserted between the outer tube of the pneumatic tire and the metallic felly, and that without the former having to be removed, and in such a manner that it may be fixed in position simply by the pneumatic tire being inflated, and so that it may be withdrawn at once, when the air has been emptied out. This arrangement, as it will be pointed out below, has several advantages in comparison with the known arrangements.

Figure 1:
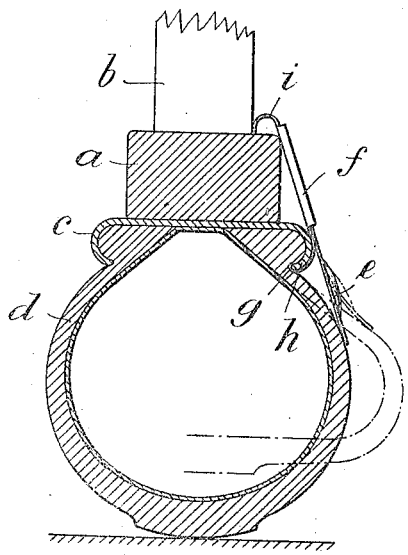
Figure 2:
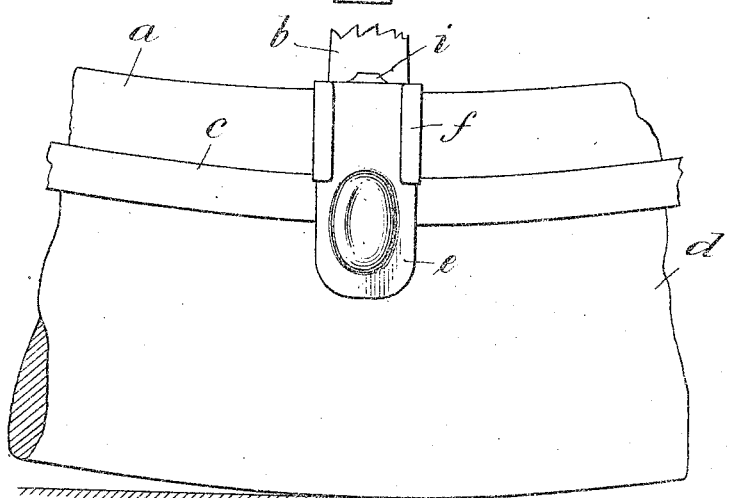

The invention is illustrated, in one manner of execution, on the drawing, Figures 1 and 2 illustrating the device, the former figure being an axial section through the wheel, the latter a view seen in the direction of the axle of the wheel.

$a$ is the wooden felly, $b$ a spoke and $c$ the steel felly, placed on the wooden felly and serving to retain the outer tube $d$ of the tire. The alarm-producing member $e$ consists, in known manner, of an elastic tongue, for instance a sheet of steel or phosphor-bronze, and is shaped so that its surface is not quite a plane, but slightly hollow. The member $e$, as illustrated on the drawing, is placed radially along the portion of the outer tube $d$, facing the wheel axis, in a holder $f$ of steel or the like. This holder has, at the bottom, a hook $g$, corresponding to the bent edge $h$ of the steel felly $c$, so that the hook $g$ of this holder may engage the felly edge $h$. The other end $i$ of the holder $f$ is arranged so that it rests, in some manner or another, and at some suitable point, against the felly $a$ or some other fixed portion of the wheel, for instance one of the spokes. The holder arranged in this manner, when the wheel is not inflated, may very easily be placed in position, even without the tire being previously removed and, as soon as the wheel is inflated, it will fix itself firmly and automatically in the proper position, and it cannot be removed from there, before the air has been emptied out of the pneumatic tire. When now the elastic tongue $e$ is moved sidewise, in consequence of the lateral pressure produced by the pneumatic tire losing its air, then the holder $f$, in order that the signal may be produced, must not be affected by such pressure and, consequently, the holder must rest against some firm portion of the wheel. In the manner of execution illustrated on the drawing, the holder is therefore fitted, at top, with a hook $i$, possessing the great advantage that it may easily be adjusted to any wheel, solely by means of a pair of pliers.

In comparison with known devices, the present device has the following main advantages: It may be attached to any standard wheel without altering or injuring the latter and without any loose fastening members being required, as all the wheels are fitted with steel fellies with bent edges and of the same shape. Its weight is extremely slight and, above all, it is but a small fraction of the weight of other known alarm devices, and, for that reason, its injurious effect on the rubber tube is minimal, such effect being quite prominent in case of the known devices, the reason being, as it is well known, that these rather heavy devices greatly disturb the balancing of the wheel. The device does not project beyond the tangential (at a right angle to the wheel axis) plane of the inflated pneumatic tire, and it is therefore exposed to no injuries, due either to collision with the curb stones or—when the device is attached to the inner face of the wheel—to interference with the body of the automobile in consequence of the oscillations of the latter or, in case of automobiles driven by chains which are always placed close to the tires, to any interference with the chain.

As the device allows the use of a very short sound producing tongue, because the fixed point of attachment of the latter is located below on the steel felly and, as the attachment of the holder to the wheel is a very stiff one, the sensitiveness of the device will be very great. Owing to the short distance between the point of contact of the tongue with the tire and its point of support in the holder and owing to the stiffness of the holder, the angular motion of the tongue relatively to its holder, required to produce the signal, will evidently be effected even by a very slight lateral expansion of the tire.

Having now particularly described and ascertained the nature of my said invention and in what manner the same is to be performed, I declare that what I claim is:—

1. In an acoustic deflation indicator for pneumatic tires the combination with a noise producing structure consisting in a resilient slightly hollow metallic tongue placed within reach of the tire, of a clip supporting said tongue and having a portion inserted between the felly and the tire and having at its rear end a projection resting against a non-resilient portion of the wheel.

2. In an acoustic deflation indicator for pneumatic tires the combination with a noise producing structure consisting in a resilient slightly hollow metallic tongue placed within reach of the tire, of a clip supporting said tongue and having a hook-shaped portion inserted between the felly and the tire and having at its rear end another hook-shaped portion resting against a non-resilient portion of the wheel.

In testimony whereof the foregoing specification is signed in the presence of two witnesses.

HAGBART SYLVESTER CHRISTOPHERSEN.

Witnesses:
 JULIUS LEHMANN,
 CARL FOX MAULE.